July 23, 1929.   F. G. HENDRICKSON   1,721,558
BOOK HOLDER AND READING CASE
Filed March 31, 1926   2 Sheets-Sheet 1
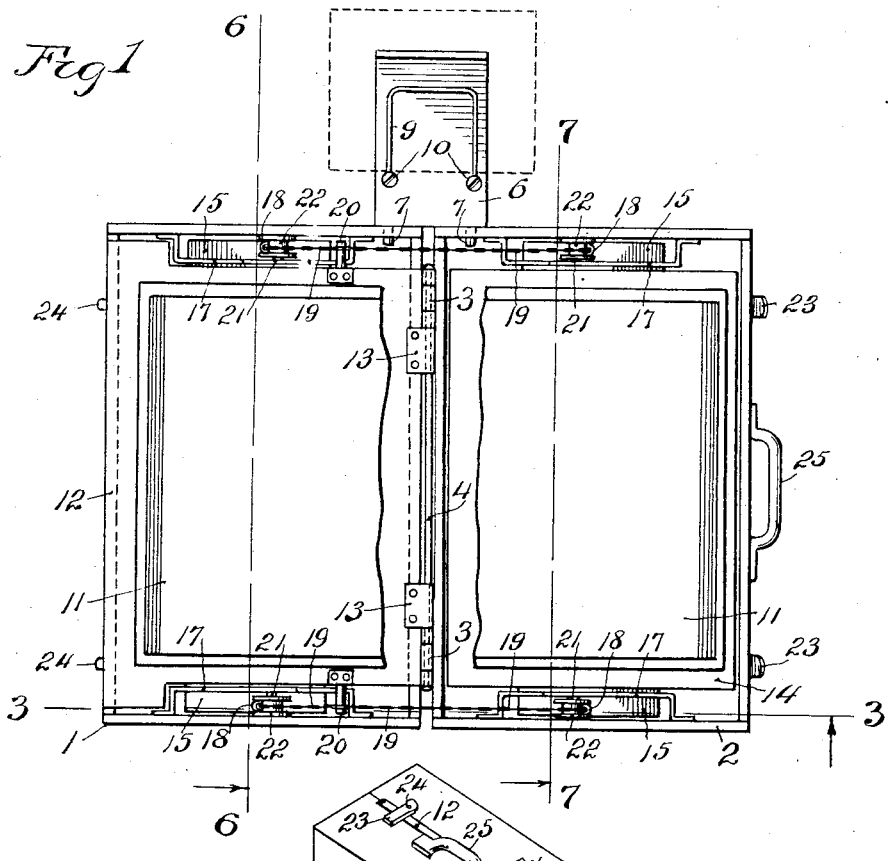
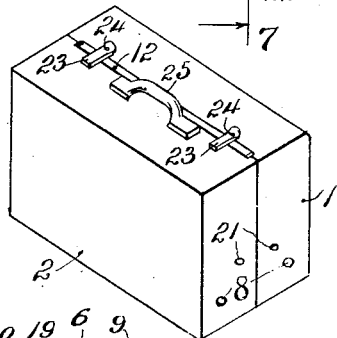
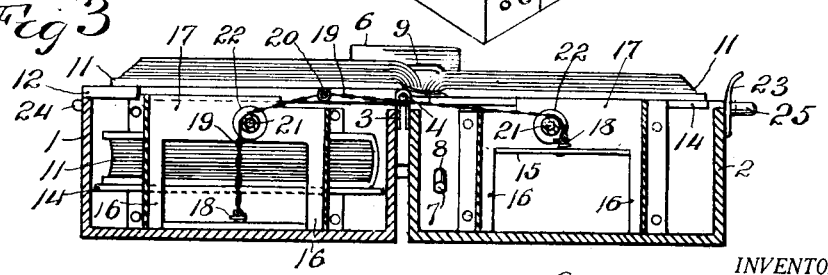
INVENTOR.
Frank G. Hendrickson
BY Warren L. House,
His ATTORNEY.
Witness:
R. Hamilton July 23, 1929. F. G. HENDRICKSON 1,721,558
BOOK HOLDER AND READING CASE
Filed March 31, 1926    2 Sheets-Sheet 2
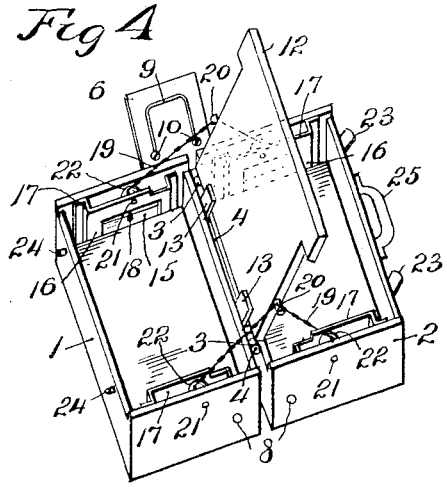
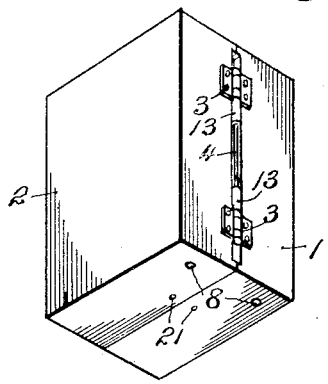
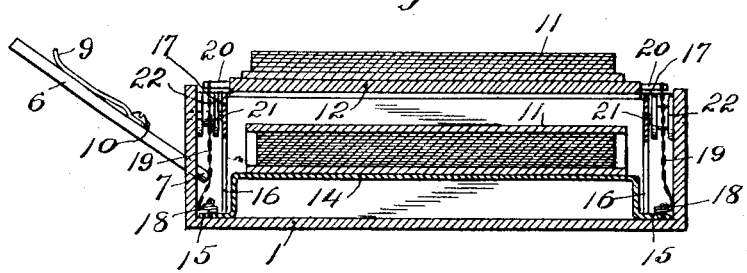
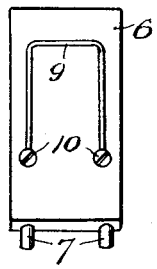
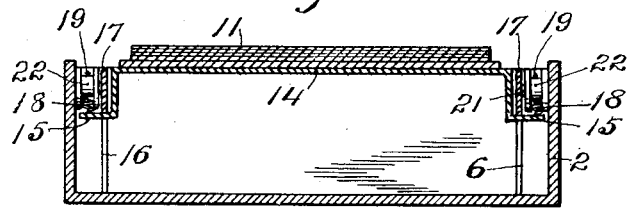
INVENTOR.
Frank G. Hendrickson,
BY Warren D. House,
His ATTORNEY.
Witness:
R. E. Hamilton Patented July 23, 1929.

1,721,558

UNITED STATES PATENT OFFICE.

FRANK G. HENDRICKSON, OF KANSAS CITY, MISSOURI.

BOOK HOLDER AND READING CASE.

Application filed March 31, 1926. Serial No. 98,653.

My invention relates to improvements in book holders and reading cases.

My invention has for one of its objects, the provision of a novel reading case, which in the closed position is adapted to hold one or more books, and when disposed in the open position has means for holding one of the books in a convenient reading position.

Another object of my invention is the provision of novel means for releasably holding the case in the open position, said means affording also means for holding a pamphlet or book in a reading position.

My invention has also for one of its objects the provision of a book holder and reading case, which is simple, cheap to make, durable not liable to get out of order, which is strong, compact, and easy to operate.

The novel features of my invention are hereinafter fully described and claimed.

In the accompanying drawings which illustrate the preferred embodiment of my invention, Fig. 1 is a plan view of my improved book holder and reading case shown in the open reading position, and a book, partly broken away, being shown mounted in an open position on the lid and one of the book supporting members.

Fig. 2 is a reduced perspective view of the reading case, shown in the closed position.

Fig. 3 is a section on the line 3—3 of Fig. 1.

Fig. 4 is a reduced perspective view of the case, shown in the open position, with the lid in an intermediate position.

Fig. 5 is a reduced perspective view of the case, shown closed and inverted.

Fig. 6 is a section on the line 6—6 of Fig. 1.

Fig. 7 is a section on the line 7—7 of Fig. 1.

Fig. 8 is a plan view of the reading shelf.

Similar reference characters designate similar parts in the different views.

The reading case and book holder comprises two boxes 1 and 2 which at their upper longitudinal adjacent edges are hinged together by two hinges 3 having a common pintle 4, so as to be swung from a closed position, shown in Figs. 2 and 5 to an open reading position, Figs. 1, 3, 6 and 7, in which last named position, the boxes 1 and 2 are disposed horizontally side by side, in which position they are adapted to be releasably held by a reading shelf 6, Figs. 1, 4, 6 and 8, which at one end has two projections or pins 7 adapted to respectively enter two inwardly and downwardly inclined holes 8 provided one hole in each end of each box, so that the shelf can be applied to either end of the case.

The shelf 6 has a U-shaped spring 9 attached to its upper side, the ends of the arms being fastened respectively to two screws 10 mounted in the shelf 6. A pamphlet or small book, indicated by dotted lines in Fig. 1, may be slipped between and held in a reading position by the wire 9 and the shelf 6.

The boxes 1 and 2 are each adapted to hold one book 11, one of which is shown closed and disposed in the box 1 and the other of which is shown mounted in an open position in Figs. 1, 3 and 6, one cover of the open book being disposed on a lid 12 having mounted at its inner edge two clips 13 through which the pintle 4 extends, the other cover of the open book resting upon a horizontal book supporting member 14, which is vertically movable to and from a position in which its upper side will be substantially flush with the upper edges of the box 2.

A similar book supporting member is similarly mounted in the box 1.

The lid 12 is adapted to be swung from a position resting horizontally on the box 1 to a position resting on the box 2.

For lifting the book supporting members 14, each of said members is provided at opposite ends respectively with two depressed extensions 15, which are respectively slidably fitted and guided by and between the downwardly extending arms 16 of two vertical U-shaped plates 17 respectively secured to the inner sides of the ends of the box containing the member. Fastened to the upper sides of the extensions 15 are two short stout coil springs 18 to which are respectively secured one set of ends of flexible members, such as chains 19, which are fastened to two pins 20 extending horizontally from the ends of the lid 12.

Four pins 21 are respectively mounted in the plates 17 and the adjacent ends of the boxes 1 and 2, and on these pins between the plates 17 and the adjacent ends of the boxes 1 and 2 are revolubly mounted four rollers 22 respectively. The chains 19 respectively having running engagement with the rollers 22, so that the latter serve as bearings for the chains.

When the lid 12 is swung to the left to the position shown in Figs. 1 and 3, the chains 19 attached to the member 14 which is in the box 2 will lift said member, through the intervention of the springs 18 thereon, to the position shown in Fig. 3, in which position, the upper side of the member 14, which has been lifted, will be flush with the upper edges of the ends of the box 2, and the extensions 15 of said member will respectively strike at their upper sides against the under sides of the transverse portions of the plates 17 adjacent to said member 14.

In this position of the supporting member 14 in the box 2, the lid 12 will rest on the box 1, Fig. 3, and one of the books 11 may be placed in the open position with the covers thereof resting respectively upon the lid 12 and the member 14 which is in the box 2.

Upon closing the book, and then swinging the lid 12 to the right, as viewed in Figs. 3 and 4, so that the lid will rest on the box 2, the supporting member 14 in the box 1 will be lifted, until its extensions strike the under edge of the plates 17 in the box 1, through the intermediacy of the chains 19 and springs 18 attached to the said extensions 15. The upper side of the member 14 in the box 1 will now be flush with the upper edges of the box 1, and the member 14 in the box 2 will be lowered, with the book mounted thereon disposed in the box 2.

When the lid 12 swings to and from either horizontal book supporting position, the chains 19 will pass across the axis of the lid 12, thereby preventing the weight of the book on the raised supporting member 14 from forcing the said member downwardly into the box in which it is mounted.

In the operation of my invention, when the books are not in use, they may both be stored in one of the boxes, as can the shelf 6. The boxes 1 and 2 may be swung to the closed position shown in Figs. 2 and 5 and each locked in such position by any suitable means, such as a spring plate 23, which is fastened to one side of the box 2 and has a hole for receiving a tin 24 mounted in the outer side of the box 1, Fig. 2. The box 2 may have a handle 25 fastened to the side having the plates 23 attached thereto.

When the device is to be used, the plates 23 are unfastened from the pins 24 and the boxes 1 and 2 are swung to the open horizontal position, Figs. 1, 3 and 4, and the shelf 6 has its projections 7 inserted respectively in the two holes 8 at either end of the case, thus holding the boxes 1 and 2 from closing.

The lid 12 may then be swung onto either of the boxes 1 or 2, thus lifting the supporting member 14 in the other box to the book supporting position, as described, the chains 19 in the swinging of the lid crossing the axis of the latter, thus holding the lid in the position to which it has been moved. The lid 12 and raised supporting member 14 may then be used to support an open book 11, as shown in Figs. 1 and 3. A book, magazine or other printed publication may then be inserted between the spring wire 9 and the shelf 6 and be thereby held in a position for reading.

I do not limit my invention to the structure shown and described, as modifications, within the scope of the appended claims, may be made without departing from the spirit of my invention.

What I claim is:—

1. In a book holder and reading case, a box adapted to hold a book, a lid hinged to said box and movable from a horizontal position closing said box to a horizontal open position, a book supporting member vertically movable in said box to and from a position substantially flush with the top of said box, and a member connecting said supporting member and said lid and arranged to lift said supporting member and to cross and extend under the axis of the lid when the latter is swung to the horizontal open position and to hold the lid in said position and the book supporting member in the raised position.

2. In a book holder and reading case, a box adapted to hold a book, a lid hinged to said box at one longitudinal upper edge thereof and movable from a horizontal position closing said box to a horizontal open position, a book supporting member vertically movable in said box to and from a position substantially flush with the upper edges of said box, two bearings in said box respectively at opposite ends thereof, and two flexible members attached to said lid and to said book supporting member and having respectively running engagement with said bearings, and arranged to lift said supporting member to said position when the lid is swung to the horizontal open position and to cross and to extend under the axis of the lid when the latter is swung to the horizontal open position and thereby hold the lid in the last named position and the book supporting member in the raised position.

3. In a book holder and reading case, a box adapted to hold a book, two rollers respectively rotatable on the inner sides of the ends of said box adjacent to the upper edges thereof, a lid hinged to said box at one longitudinal upper edge thereof and movable from a horizontal position closing said box to a horizontal open position, a book supporting member vertically movable in said box to and from a position substantially flush with the upper edges of the box, and two flexible members attached to said book supporting member and to said lid and having running engagement respectively with said rollers and arranged to cross and to extend under the axis of said lid and to raise the supporting member to and hold it in the raised position and to hold the lid in the horizontal open position, when the lid is swung to the last named position.

4. In a book holder and reading case, two boxes hinged to each other and adapted each to hold a book, a lid hinged to and between said boxes and movable to two positions respectively closing said boxes when the latter are disposed side by side, two book supporting members respectively vertically movable in said boxes to and from positions in which said supporting members will be substantially flush with the upper edges of said boxes, and means connecting said lid with said supporting members by which when the lid is swung to a position closing either of said boxes, it will move the supporting member in the other box to and hold it in the raised position.

5. In a book holder and reading case, two boxes hinged to each other and adapted each to hold a book, a lid hinged to and between said boxes and movable to two positions respectively closing said boxes when the latter are disposed side by side, two book supporting members respectively vertically movable in said boxes to and from positions in which said supporting members will be substantially flush with the upper edges of said boxes, and two flexible members connecting said supporting members respectively with said lid and by which, when the lid is swung to a position closing either of said boxes, the supporting member in the other box will be raised to and held in the raised position, said flexible members crossing the axis of the lid when the lid is oscillated to the two closing positions.

6. In a book holder and reading case, two boxes hinged to each other so as to be swung from a closed position one on the other to an open position side by side, said boxes having each at like ends a hole and a shelf having two pins adapted to respectively enter said holes when the boxes are in the open position, and when so entered supporting said shelf and holding said boxes from swinging from the open position.

7. In a combined bookholder and carrying case, the combination of two trays hinged together, a book support mounted in each tray, means for permitting each of said supports to be raised and lowered, and means including a flexible element connecting said supports for causing either to be raised when the other is lowered, substantially as described.

8. In a book holder, supporting means, two members vertically movable therein adapted to each support a book, a lid movable on said supporting means to two positions respectively above and parallel with said members, and means connecting said lid with said members by which when the lid is moved to either of said positions the member thereunder will be lowered and the other member raised.

9. In a book holder, supporting means, two members vertically movable thereon adapted to each support a book, a lid hinged to said supporting means and movable thereon to two positions respectively above and parallel with said members, and means connecting said lid with said members by which when the lid is swung to either of said positions the member thereunder will be lowered and the other member raised.

10. In a book holder, two boxes hinged together so as to be swung from a horizontal open position to a closed vertical position, two book supporting members vertically movable one in each of said boxes, means connecting said members by which said members will be retained horizontally, and means connecting said members by which either of them may be raised and the other simultaneously lowered.

In testimony whereof I have signed my name to this specification.

FRANK G. HENDRICKSON.